Inventor
Francis Harold Pook
By
Morrison, Kennedy & Campbell
Attorneys

March 3, 1970 F. H. POOK 3,498,166
CUT FIBRE DISTRIBUTION
Filed Nov. 24, 1967 4 Sheets-Sheet 3

Inventor
Francis Harold Pook
By
Morrison, Kennedy & Campbell
Attorneys

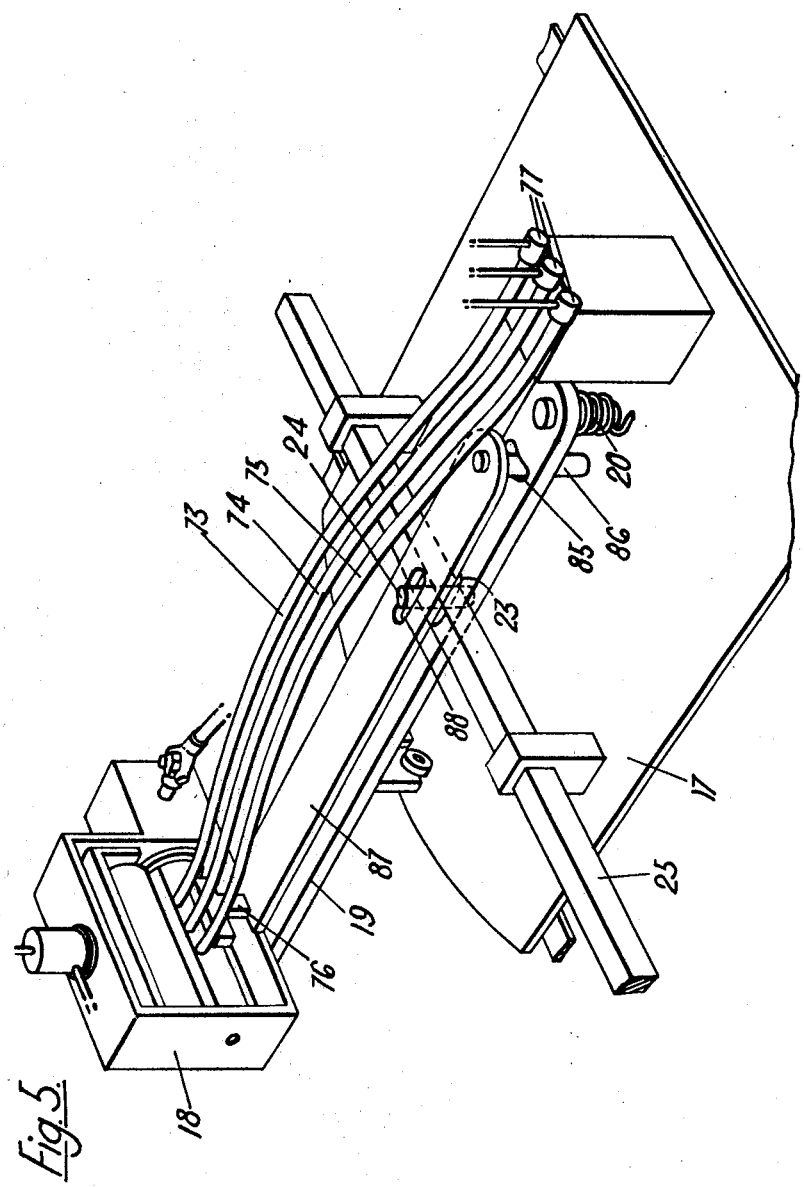

United States Patent Office 3,498,166
Patented Mar. 3, 1970

3,498,166
CUT FIBRE DISTRIBUTION
Francis Harold Pook, Sale, England, assignor to Fibreglass Limited, Liverpool, England, a corporation of Great Britain
Filed Nov. 24, 1967, Ser. No. 685,630
Claims priority, application Great Britain, Nov. 30, 1966, 53,678/66
Int. Cl. A26d 1/40
U.S. Cl. 83—23
9 Claims

ABSTRACT OF THE DISCLOSURE

Fibre distribution apparatus for the manufacture of fibre (e.g. glass fibre) reinforced resinous sheeting, in which an oscillatable support is disposed above a movable conveyor and carries a high speed fibre cutter from which cut fibres are sprayed onto a receiving surface moving with the conveyor. The cutting means includes a cutting roller and a cushion roller in contact with each other and disposed in a common vertical plane, with means for guiding fibres to the rollers.

BACKGROUND OF THE INVENTION

Field of the invention

This invention relates to apparatus for use in the production of fibre reinforced resinous sheeting or fibre mats for incorporation in such sheeting, particularly where the fibres are glass fibres.

Description of the prior art

In the production of glass fibre reinforced sheets, it is known to distribute short lengths of glass fibre strands onto a travelling conveyor, and to spray a binding fluid onto the fibres which are then compacted to form a coherent mat. At a later stage the mat is impregnated with a resin to produce a sheeting which is cured to produce a hard reinforced material. In another known process, the cut glass fibre strands are distributed directly onto a layer of resinous material, and the resulting resin-impregnated mat is then cured.

In these processes there is a requirement for a method of and apparatus for cutting strands or rovings of glass fibre into short lengths, and distributing these with random orientation onto a surface such as a travelling conveyor.

SUMMARY

According to one aspect of the invention a method of distributing cut fibres onto a receiving surface comprises the steps of establishing relative movement in a forward direction between the receiving surface and a fibre cutting means, ejecting the cut fibres at high speed from said cutting means generally in said forward direction, and simultaneously oscillating the cutting means slowly across said forward direction with an amplitude related to the width of the receiving surface.

According to another aspect of the invention, apparatus for distributing cut fibres onto a receiving surface comprises a movable conveyor carrying said receiving surface, an oscillatable support disposed above said conveyor, high speed fibre cutting means mounted on the support, said cutting means including a cutting, roller and a complementary cushion roller rotatable in contact with the cutting roller, the axes of said rollers being disposed in a common plane disposed near to the vertical, means for guiding fibres to the rollers, and actuating means engaging the support for imparting to the support and the cutting means slow oscillating motion across the line of movement of the conveyor.

The fibre cutting means used in apparatus according to this invention is a high speed fibre cutter, that is a cutter of which the rollers are driven at a speed of about 700 r.p.m.

The oscillatable support is preferably a pivoted beam, and the actuating means may comprise a rotating cam which engages a cam follower linked to the beam. The cam rotates slowly as compared to the high speed (e.g. 700 r.p.m.) of the cutter rollers.

In one preferred embodiment of the invention, the axes of the rollers extend substantially horizontally, and the rollers are disposed substantially vertically one above the other and are driven from a stationary motor via shafts and universal couplings. Alternatively, the plane of the cutter rollers may be slightly inclined to the vertical so that the initial ejection of the cut fibres has a slight upwards movement.

The means for guiding strands or rovings to the cutter may comprise a plurality of tubes, e.g. three or four, supplied with compressed air at their inlet ends to assist the feeding of the strands or rovings therethrough and into the nip between the cutter rollers.

The outlet ends of the tubes may either be fixed to the beam carrying the cutter and positioned near to the rollers, or may be mounted on a second oscillatable support having an amplitude of oscillation greater than that of the beam carrying the cutter. In the latter case, the beam carrying the cutter may be mounted on a first pivot and movable by the cam driven cam follower linked therewith, and the second oscillatable support may comprise a second beam mounted on a second pivot and also movable by the same cam follower, the second pivot being closer to the line of action of the cam follower than the first pivot.

The interaction of the cutter rollers may be controlled pneumatically, with the cushion roller mounted in a movable yoke member which is linked for movement with a piston slidable in a pneumatic cylinder, the said piston being movable to press the cushion roller onto the cutting roller when compressed air is supplied to a first end of the cylinder. The pneumatic cylinder is preferably double acting, so that pressure between the cutter rollers may be relieved by piston movement caused by compressed air being supplied to the second end of the cylinder. In the latter case, the movable yoke member may have mounting means for the cushion roller which allow the roller to be removed when the yoke is moved in such a direction as separates the rollers.

BRIEF DESCRIPTION OF THE DRAWINGS

FIG. 5 shows an alternative construction for the distributing arrangement.

DESCRIPTION OF THE PREFERRED EMBODIMENT

Figure 1:
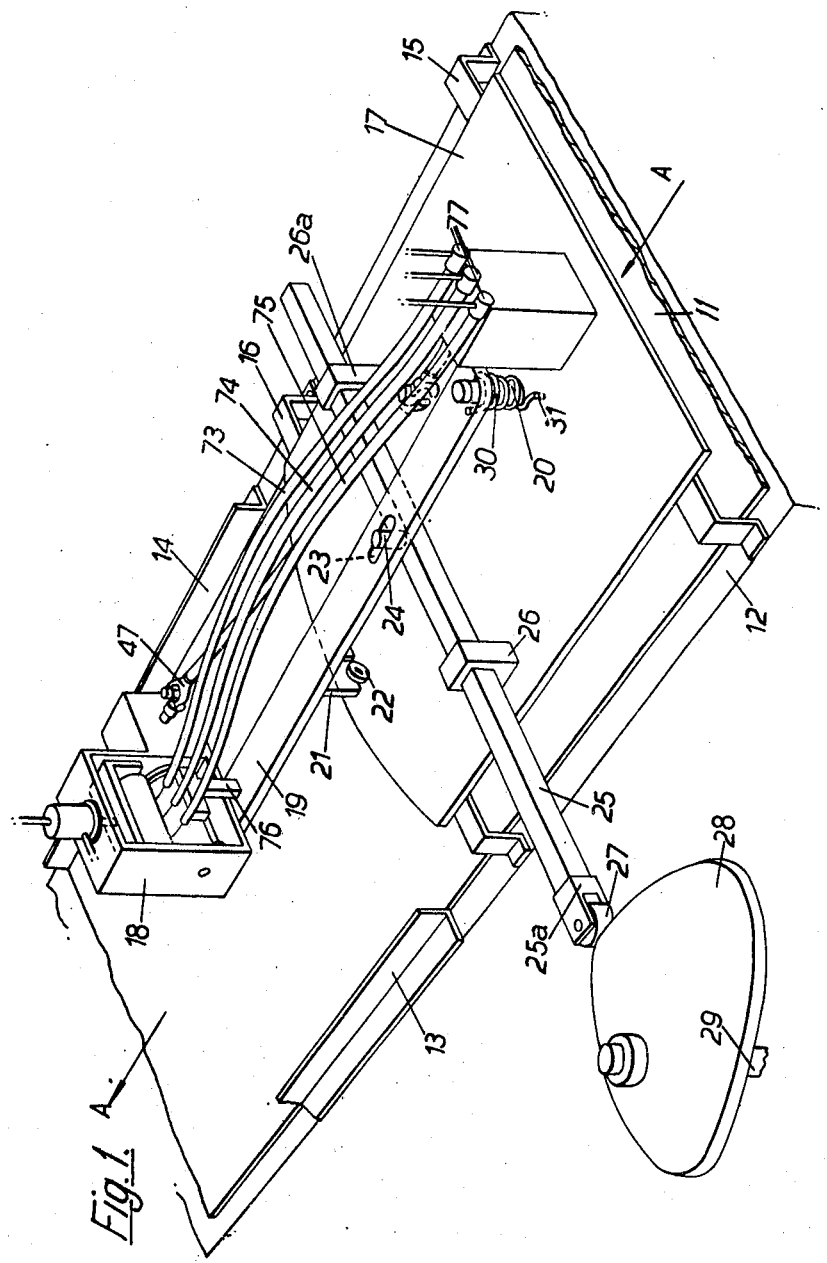
FIG. 1 shows, by way of example, a perspective view of fibre cutting and distributing apparatus.

In the apparatus shown in FIG. 1 a conveyor band 11 is drawn over a bed 12 at uniform speed in a forward direction shown by the arrow A, and passes between upstanding side rails 13 and 14. Two bridge members 15 and 16 span the conveyor band 11 and support a flat platform 17 which platform supports the fibre cutting and distributing apparatus.

An oscillatable support in the form of a beam 19 is disposed above the conveyor band 11, and has one end pivotally connected to the platform 17 by a pivot pin 20. At the other end of the beam 19 is mounted a fibre cutter rotatable at high speed, for example 700 r.p.m., this cutter being enclosed within frame 18. A foot 21 extending downwardly from the underside of beam 19 is provided with wheels 22 in contact with the platform 17 which allow the beam 19 to be angularly displaced about pivot 20 whilst maintaining frame 18 at a uniform height above conveyor band 11.

The beam 19 is slotted at 23 to allow a pin 24 to project upwardly therethrough, and pin 24 is secured to a slider bar 25 supported in bearing blocks 26 and 26a, whereby displacement of slider bar 25 is transmitted through pin 24 to cause angular displacement of the beam 19 about the pivot 20. The slider bar 25 has a fork-shaped end piece 25a which rotatably supports a roller cam follower 27 engaging with the periphery of a cam 28 secured on a shaft 29, which shaft is rotated at uniform slow rate of between 22 and 23 r.p.m.

With the mechanism described above, rotation of shaft 29 carrying cam 28 causes slider bar 25 to be reciprocated in blocks 26, 26a, reciprocation of bar 25 being transmitted through the pin 24 to cause angular oscillation of beam 19. The shape of cam 28 is so chosen that the amplitude of oscillation of the cutter is such that fibres projected horizontally therefrom are strewn over the entire width of the receiving surface carried by the conveyor 11, although the amplitude of the cutter oscillation will be less than the width of the receiving surface. A coil spring 30 anchored at 31 to the platform 17 acts through beam 19, pin 24, slider bar 25 and forked member 25a to maintain the roller 27 in engagement with the periphery of the cam 28 so that there is no free play in the mechanism and the limits of the angular oscillation of beam 19 can be accurately controlled.

Figure 3:
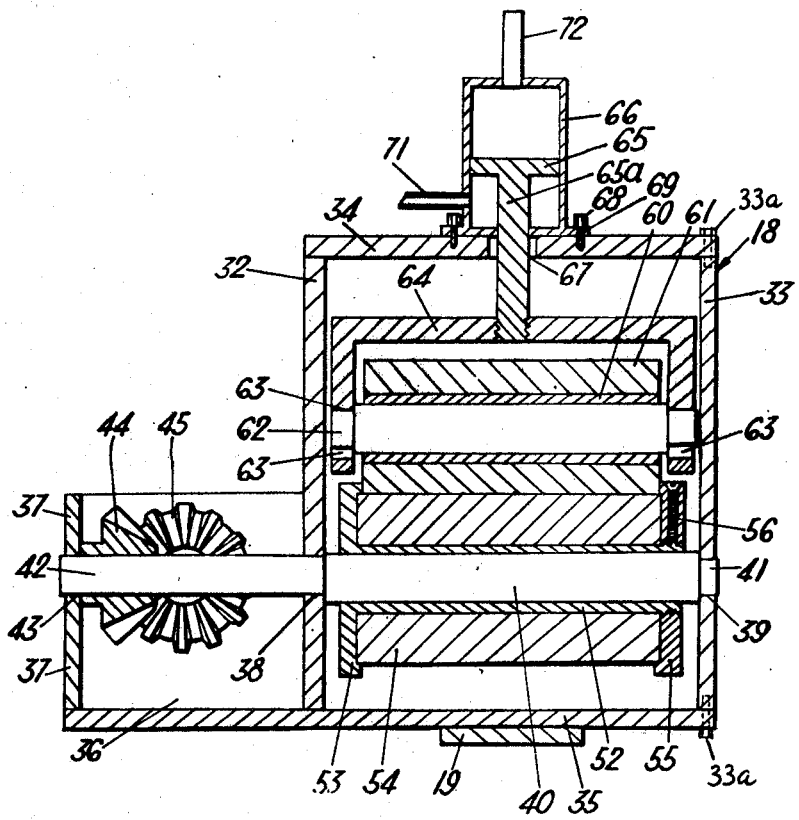
FIG. 3 shows a section through the cutting arrangement on line I—I of FIG. 2.

Referring particularly to FIG. 3, the cutter frame 18 comprises two parallel side plates 32, 33, a top plate 34, and a bottom plate 35, the bottom plate 35 being secured to the beam 19 so that the remaining parts of the frame 18 are above the beam 19.

Bottom plate 35 has a greater length than top plate 34 and extends beneath side plate 32 and outwardly therefrom to form the floor of a drive chamber. Plate 36 forms a back plate for the drive chamber and plate 37, supported by bottom plate 35 and back plate 36, closes the outer end of the drive chamber.

The side walls 32 and 33 are bored at 38 and 39 respectively to rotatably support a shaft 40 which has a reduced diameter end section 41 rotatably supported in bore 39 and a reduced diameter extension 42 which passes through bore 38 and is supported at its extreme end by a bore 43 in plate 37.

The shaft extension 42 has a bevel pinion 44 secured thereon which engages with a bevel pinion 45 secured on the end of a shaft 46 (FIG. 2) which is rotatably supported in the back plate 36 of the drive chamber.

Figure 2:
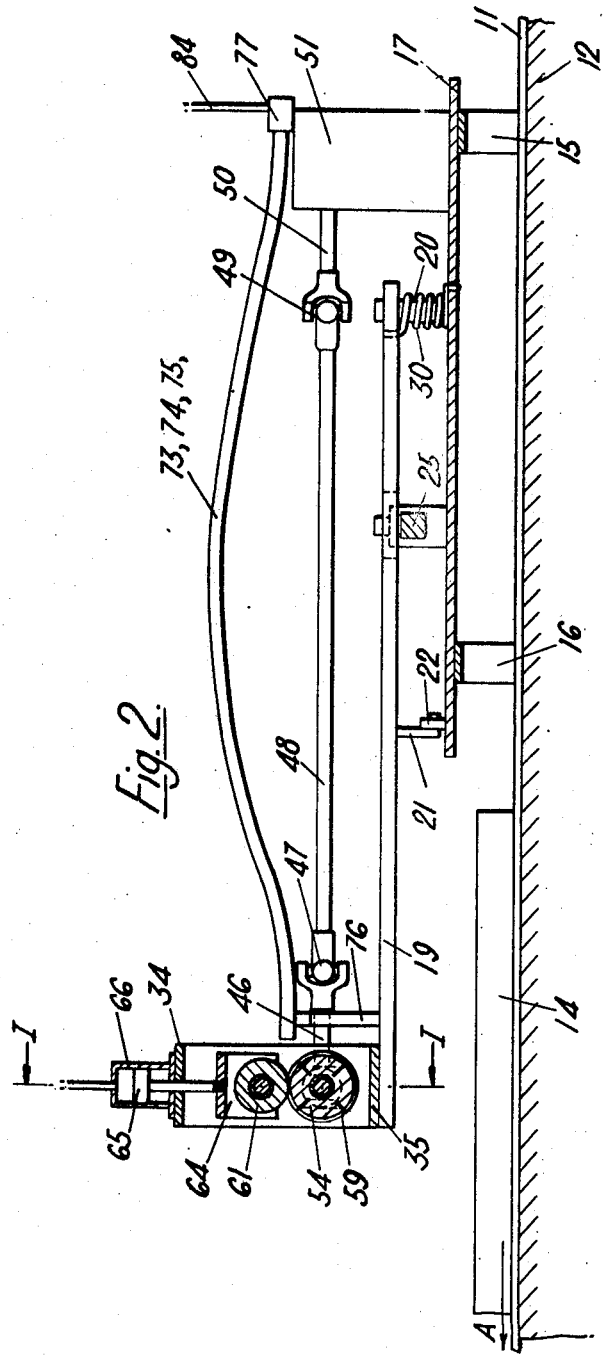
FIG. 2 is a partially sectioned side view of the apparatus shown in FIG. 1.

As shown in FIG. 2, the shaft 46 is connected by a universal coupling 47 to a shaft 48 which is in turn connected by a second universal coupling 49 to the output shaft 50 of a drive motor 51 secured on platform 17. By this arrangement, drive is transmitted from motor 51 through shaft 50, coupling 49, shaft 48, coupling 47, shaft 46, and pinions 45 and 44 to cause rotation of shaft 40 at about 700 r.p.m. The coupling 49 is located directly above the pivot pin 20 so that drive can be transmitted from motor 51 to shaft 40 in all angular positions of beam 19.

Referring again to FIG. 3, the shaft 40 supports a cutting roller which comprises a tubular core member 52 with a large end flange 53 formed thereon, a roller body 54 which is mounted on the tube 52, and a retaining disc 55 which is screwed onto tube 52 and secured by a screw 56. As shown in FIG. 2, the roller body 54 has four radial slots each of which holds a cutter blade 59 so that the cutting edge of each blade 59 projects from the periphery of the body 54, the blades 59 being equally spaced about the periphery of the body 54.

The flange 53 and retaining disc 55 have a slightly greater diameter than the body 54 and are centrally recessed so that when assembled the extreme ends of body 54 lie within the recesses in flange 53 and retaining disc 55 and the blades 59, which have a length equal to the length of body 54, are thereby retained in their respective slots against radial displacement.

A cushion roller, comprising a tubular core 60 and a roller body 61, is rotatably supported above the cutting roller on a shaft 62 which shaft 62 is supported in vertical slots 63 cut in the downwardly extending side arms of a yoke member 64. These slots have semi-circular upper ends which are dimensioned to rotatably support the ends of shaft 62, and the slots also have horizontal portions leading from the lower regions thereof to the front of the yoke 64, which horizontal slot portions allow removal of the shaft 62 from the yoke. The member 64 lies between plates 32 and 33 and is supported therebetween by the stem 65a of a piston 65. The piston 65 is slidably mounted in a double-acting pneumatic cylinder 66 and has its stem 65a depending downwardly through a bore 67 in plate 34 and secured into the yoke 64, so that the vertical position of yoke 64 is dependent upon the position of piston 65 in cylinder 66.

The cylinder 66 is secured to the plate 34 by volts 68 which pass through lugs 69 formed integrally with the cylinder 66 and the bolts 68 engage in tapped bores in plate 34. The cylinder 66 has a duct 71 communicating with the lower regions thereof through which compressed air can flow into or out of one end of cylinder 66 beneath the piston 65, and a second duct 72 by way of which compressed air can flow into and out of the other end of cylinder 66 above the piston 65.

The slots 63 in yoke 64 provide mounting means which allow the cushion roller combination 60, 61, mounted on shaft 62, to be inserted into the yoke 64 from the front when the yoke 64 is raised by piston 65, the reduced diameter ends of shaft 62 passing readily through the horizontal portions of slot 63 and into the vertical regions of said slots, the shaft 62 being retained at the tops of these slots when the yoke is lowered by piston 65.

The roller body 61 has a length slightly less than the length of the body 54 of the cutting roller exposed between end flange 53 and retaining disc 55 so that body 61 rotates in contact with the exposed regions of body 54, and it will be seen that with the above arrangement air can be supplied to cylinder 66 through duct 72 and allowed to escape through duct 71 to allow piston 65 to be downwardly displaced and thus carry the yoke 64 and roller assembly 60, 61 downwardly until the cushion roller body 61 is pressed into engagement with cutting roller body 54. By carefully balancing the air pressures in ducts 72, 71, and thereby the pressures acting on the opposite faces of the piston 65, the pressure between cushion and cutting rollers can be very accurately controlled. Further, by supplying air through duct 71 and allowing air to escape through duct 72, piston 65 can be elevated to relieve the pressure between the rollers, and to lift yoke 64 and to allow removal and replacement of roller body 61.

It will be noted that with the arrangement shown, with the cutter rollers having horizontal axes and being disposed vertically one above the other so that their axes are in the same vertical plane, the pass between the rollers extends horizontally so that cut fibres are projected by the rollers in a horizontal direction. In a modified arrangement however the plane of the axes of the rollers is slightly inclined to the vertical so that the initial ejection of the cut fibres has a slight upwards movement.

Referring again to FIG. 1, the glass fibre strands to be cut by the cutter arrangement illustrated are supplied through three flexible tubes 73, 74 and 75 which have their forward ends supported by a T member 76 secured on beam 19 and their rear ends communicating with feeder members 77.

Figure 4:
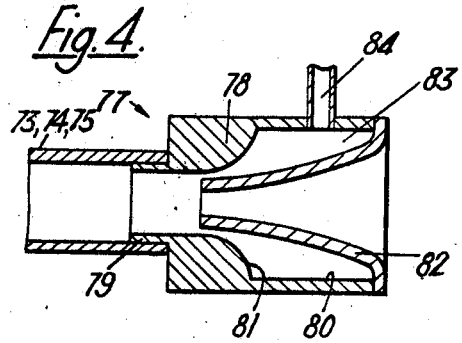
FIG. 4 shows a vertical section through a fibre feeder member.

Each feeder member 77 (see FIG. 4) comprises a tubular body 78 with a forwardly extending nipple 79, upon which the rear end of a tube 73, 74 or 75 is secured, and the body 78 has a large plain bore 80 through the forward part of its length and a bell-shaped bore 81 in the rear part of its length. The bell-shaped bore 81 extends from a maximum diameter equal to the diameter of bore 80, to a small diameter which forms the bore through nipple 79.

The enlarged bore section 80 of member 78 is partially closed by a bell-shaped member 82 which is open at its large bore end to provide for easy entry of the filaments thereinto, and has a gradually reducing bore which opens into the restricted bore region 81 of member 78. Between members 82 and 78 an annular passage 83 is formed which is supplied with air under pressure by way of a duct 84. Air released into the annular passage 83 through duct 84 can escape only by flowing towards the restricted bore region 81 and the air therefore flows through the very small annular passage between the small end of member 82 and the restricted bore 81 and serves to draw fibre strands entering member 82 along the flexible tube 73, 74 or 75 to the forward end of said tube adjacent the cutter rollers.

It will be seen that with this construction the strands can readily and easily be fed into the enlarged bell-like mouth of member 82 and said strands are easily conveyed along the tubes 73, 74 and 75 and leave the outlet ends of said tubes 73, 74 and 75 in an outgoing current of air which carries and directs said filaments into the nip between cutting roller 54 and cushion roller 61.

In the apparatus shown in FIGS. 1 and 2, the outlet ends of tubes 73, 74 and 75 adjacent the cutter have a fixed position relative to the cutter but in FIG. 5 an arrangement is shown in which the outlet ends of tubes 73, 74, 75 are fixed to a second oscillatable support having an amplitude of oscillation greater than that of the beam 19. This causes the tube ends to traverse the cutter rollers and this movement allows the use of cutter rollers of greater length and ensures substantially uniform wear of the cutter blades, so that longer cutter life is obtained.

As shown in FIG. 5, beam 19 lies below slider bar 25 and slider bar 25 has a pin 24 extending both downwardly and upwardly therefrom so that the lower end of the pin engages in the slot 23 in beam 19 to cause angular displacement of beam 19 about pivot 20 in exactly the same manner as that described with respect to the previous example. The beam 19 has an arcuate slot 85 near pivot 20 to allow a fixed pivot pin 86, secured to platform 17, to project upwardly through beam 19 without affecting the angular displacement of beam 19. Pivot pin 86 constitutes a pivot for a beam 87 which extends in the direction of beam 19 and carries the T-shaped member 76 supporting the ends of flexible tubes 73, 74. 75 adjacent the cutter rollers. Beam 87 has a slot 88 therein which allows the pin 24 on slider bar 25 to project upwardly therethrough, and it will be seen that with the above arrangement pin 24 causes equal linear displacement of beams 19 and 87 in the plane of slider bar 25 but, since the pivot 86 is closer to the line of action of slider bar 25 than is the pivot 20, the beam 87 is displaced through a greater angular displacement than beam 19. The arrangement is such that the outlet ends of tubes 73, 74, 75 lie near one end of the cutting roller 54 in one extreme position of beams 19 and 87, and as the beams 19, 87 are traversed to the other extreme position the exit end of tubes 73, 74, 75 are traversed towards the other end of cutting roller 54.

In operation, the conveyor band 11 is overlaid with a layer of impervious plastic sheeting, which is provided with a layer of resinous fluid before reaching the vicinity of the cutting and distributing apparatus. As the plastic sheet passes under the outlet side of the cutter 18, it is strewn with short lengths of glass fibre issuing from the cutter. The projection of the glass fibres horizontally from the cutters, which is assisted by the air issuing from the tubes 73, 74 and 75, ensures that the fibres falling onto the resinous slurry have a random orientation, and the lateral oscillation of cutter across the line of travel of the conveyor ensures even distribution across the width of the plastic sheeting.

In a later stage, not shown in the drawings, the resin impregnated fibres are overlaid with a second plastic sheet, and compacted together.

The apparatus described is designed to operate with individual strands of glass fibre. Similar apparatus may however be designed so as to operate with rovings, that is to say formations of many strands grouped together in substantially parallel untwisted relationship.

We claim:

1. A method of distributing cut fibres onto a receiving surface, comprising establishing movement of the receiving surface below fibre cutting means, guiding fibre strands or rovings to the fibre cutting means, ejecting cut fibres at high speed from the cutting means generally in the direction of movement of the receiving surface, and oscillating the cutting means across the receiving surface and about a fixed axis, the speed of oscillation being slow in relation to the speed of ejection of the cut fibres and the amplitude of the oscillations being less than the width of the receiving surface whilst acting to distribute the ejected cut fibres over the entire width of the receiving surface.

2. Apparatus for distributing cut fibres onto a receiving surface, comprising a movable conveyor carrying said receiving surface, an oscillatable support disposed above the receiving surface, high speed fibre cutting means mounted on the support, said cutting means including a cutting roller and a complementary cushion roller rotatable in contact with the cutting roller, the axes of said rollers being disposed in a common plane, means for establishing movement of the receiving surface below the fibre cutting means in the same general direction as the direction of ejection of the cut fibres from the cutting means, means for guiding fibre strands or rovings to the cutting means, and actuating means engaging the support for oscillating the support and the cutting means across the receiving surface and about a fixed axis, the speed of oscillation being slow in relation to the speed of ejection of the cut fibres and the amplitude of the oscillations being less than the width of the receiving surface whilst acting to distribute the ejected cut fibres over the entire width of the receiving surface.

3. Apparatus according to claim 2, wherein the axes of the cutting roller and the cushion roller extend substantially horizontally, the rollers being disposed substantially vertically one above the other.

4. Apparatus according to claim 2, wherein the axes of the cutting roller and the cushion roller extend substantially horizontally, and in which the plane of the axes of the rollers is slightly inclined to the vertical so that the initial ejection of the cut fibres has a slight upward movement.

5. Apparatus according to claim 2, wherein the actuating means comprises a rotating cam engaging a cam follower linked to the oscillatable support carrying the cutting means.

6. Apparatus according to claim 2, wherein there is provided a movable yoke member in which the cushion roller is mounted, and there is further provided a piston and cylinder combination the piston of which is linked for movement with said movable yoke member, said piston being movable to press the cushion roller onto the cutting roller when compressed air is supplied to a first end of the cylinder.

7. Apparatus according to claim 6 wherein the pneumatic cylinder is double acting so that pressure between the rollers may be relieved by piston movement caused by compressed air being supplied to the second end of the cylinder, and in which the movable yoke member has mounting means for the cushion roller which allow said roller to be removed therefrom when yoke is moved in such a direction as separates the rollers.

8. Apparatus for distributing cut fibres onto a receiving surface, comprising a movable conveyor carrying said receiving surface, a first oscillatable support disposed above said conveyor, high speed fibre cutting means mounted on the support, said cutting means including a cutting roller and a complementary cushion roller rotatable in contact with the cutting roller, the axes of said rollers being disposed in a common plane, means for establishing movement of the receiving surface below the fibre cutting means in the same general direction as the direction of ejection of the cut fibres from the cutting means, means for guiding fibres to the cutting means which guide means comprise a plurality of tubes, the outlet ends of said tubes being fixed to a second oscillatable support, and actuating means engaging both the first and the second oscillatable supports for oscillating both the supports and the cutting means across the receiving surface and about a fixed axis, the speed of oscillation of the first oscillatable support carrying the cutting means being slow in relation to the speed of ejection of the cut fibres and the amplitude of the oscillations of the second oscillatable support being greater than that of the first oscillatable support.

9. Apparatus according to claim 8, wherein the actuating means comprises a rotating cam engaging a cam follower connected by a link to both the first and second oscillatable supports, wherein the first oscillatable support comprises a beam mounted on a first pivot, the beam being connected by the said link to the cam follower for movement thereby, and wherein the second oscillatable support comprises a second beam mounted on a second pivot which second beam is also connected by the said link to the cam follower, said second pivot being closer to the line of action of the said link than the first pivot.

References Cited

UNITED STATES PATENTS

| 2,014,947 | 9/1935 | McCulloch et al. | 83—913 X |
| 2,719,336 | 10/1955 | Stotler | 83—913 X |
| 2,729,028 | 1/1936 | Slayter et al. | 83—913 X |
| 3,164,047 | 1/1965 | Spicer et al. | 83—913 X |
| 3,233,991 | 2/1966 | Stalego | 83—913 X |
| 3,362,270 | 1/1968 | Meath et al. | 83—913 X |

WILLIAM S. LAWSON, Primary Examiner

U.S. Cl. X.R.

83—155, 913